(12) United States Patent
Kletensky et al.

(10) Patent No.: US 7,322,724 B2
(45) Date of Patent: Jan. 29, 2008

(54) VEHICLE HEADLAMP WITH CONCURRENT VERTICAL AND INDEPENDENT HORIZONTAL ADJUSTMENT OF LOW AND HIGH BEAM LIGHT CHAMBERS

(75) Inventors: Daniel Kletensky, Rybi (CZ); Milan Cejnek, Novy Jicin (CZ); Libor Stambersky, Senov u Noveho Jicina (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 267 days.

(21) Appl. No.: 10/820,913

(22) Filed: Apr. 8, 2004

(65) Prior Publication Data

US 2004/0257820 A1   Dec. 23, 2004

(30) Foreign Application Priority Data

Apr. 8, 2003   (CZ) .................................. 2003-982

(51) Int. Cl.
*B60Q 1/08* (2006.01)
(52) U.S. Cl. ...................... 362/465; 362/514; 362/525; 362/531; 362/276; 362/284
(58) Field of Classification Search ................ 362/465, 362/514, 519, 525, 531, 276, 284
See application file for complete search history.

(56) References Cited

U.S. PATENT DOCUMENTS

| | | | |
|---|---|---|---|
| 6,457,851 B2 * | 10/2002 | Hamm ........................ | 362/525 |
| 6,481,865 B2 * | 11/2002 | Woerner et al. ............... | 362/41 |
| 6,485,168 B2 * | 11/2002 | Rosenhahn et al. .......... | 362/465 |
| 6,527,424 B2 * | 3/2003 | Rosenhahn et al. .......... | 362/514 |
| 6,540,386 B2 * | 4/2003 | Fujino et al. ................ | 362/525 |
| 2002/0097585 A1 * | 7/2002 | Mochizuki et al. .......... | 362/517 |

FOREIGN PATENT DOCUMENTS

| GB | 2 266 947 A | 11/1993 |
|---|---|---|
| GB | 2 276 441 A | 9/1994 |
| WO | WO 94/09310 | 4/1994 |

* cited by examiner

*Primary Examiner*—Jong-Suk (James) Lee
*Assistant Examiner*—Ismael Negron
(74) *Attorney, Agent, or Firm*—Brinks Hofer Gilson & Lione

(57) ABSTRACT

A headlamp for motor vehicles of the reflector or projector design having at least one low beam light chamber, with a discharge light source, and at least one high beam light chamber, with a halogen light source. The direction of the rays produced in the high beam light operational mode are adjusted by means of simultaneous vertical swiveling of both light chambers and independent horizontal adjustment of the low beam light chamber.

8 Claims, 3 Drawing Sheets

VEHICLE HEADLAMP WITH CONCURRENT VERTICAL AND INDEPENDENT HORIZONTAL ADJUSTMENT OF LOW AND HIGH BEAM LIGHT CHAMBERS

FIELD OF THE INVENTION

The invention relates to a headlamp having a reflector or projector design, wherein the headlamp includes at least one low beam light chamber and at least one high beam light chamber.

BACKGROUND

In the case of a headlamp having a discharge light source for low beam light, the change from low beam light operational mode to high beam light operational mode is solved by means of an additional statical light chamber having halogen light source, or by means of the mechanical movement of the optical element, such as discharge light source, an occulter, a reflector or a part of the reflector, relative to the whole headlamp (see the patent documents U.S. Pat. No. 5,769,525, DE 197 41 377, DE 197 10 632).

The disadvantages of the above mentioned solutions include the use of additional action members, their installation in headlamp, the increased weight of the whole headlamp, the greater susceptibility of the system to failure, and the higher cost of said headlamp.

A further concern occurs when using the discharge light source in the flasher mode, where the service life is decreased as a consequence of repeated switching on.

At the present time this function is solved by means of an additional light chamber, which is also used for high beam light. From this point of view the most advantageous solution for optimization of high beam light operational mode seems to be use of an adjusting action member, which must be part of an automatic adjusting system in a construction having a discharge light source, and use of a horizontal action member to allow horizontal swiveling of low beam light chamber.

This automatic adjusting system comprises sensors for evaluation of the angle of inclination of the vehicle, a control unit for evaluation of input signals from sensors, and an adjusting action member to respond to the control unit.

The adjusting action member provides swiveling of the whole reflector around a pivot fulcrum so as to maintain correct adjustment of the vertical inclination of the low beam boundary, according to the prescribed requirements.

The horizontal adjusting action member allows for a change in the horizontal position of the low beam light chamber for better illumination of the road in curves.

SUMMARY OF THE INVENTION

The above mentioned disadvantages have been reduced or eliminated by means of a headlamp for motor vehicles for low beam and high beam light operational modes with at least one low beam light chamber having a discharge light source and at least one high beam light chamber working as an addition to the low beam light. In the high beam light operation mode, both the low beam light chamber and high beam light chamber are vertically adjusted by means of vertical adjusting action member and the low beam light chamber is further horizontally adjusted by means of a horizontal adjusting action member.

For high beam light operation mode, both the low beam light chamber and high beam light chamber can be advantageously vertically adjusted by means of the vertical adjusting action member.

For high beam light operation mode, the low beam light chamber can be advantageously horizontally adjusted by means of the horizontal adjusting action member.

In a preferred embodiment according to the present invention, the vertical adjusting action member forms part of automatic adjusting system.

In a further preferred embodiment according to the present invention, the horizontal adjusting action member forms part of the mechanism allowing the horizontal swiveling of the low beam light chamber.

Switching on the halogen light source is advantageously delayed relative to switching on of the high beam light.

The halogen light source is advantageously used for high beam lights.

For low beam light, the rays are produced only by the low beam light chambers. For high beam light, the rays are produced both by the high beam light chambers and low beam light chambers, wherein the direction of the rays produced by the light chambers is optimized through the horizontal and vertical swiveling of the headlamp light chambers.

Accordingly, the disadvantage of additional external action members is eliminated by means of a headlamp comprising low beam and high beam light chambers having approximately parabolic or elliptic shape, occulter, lens in case of using elliptically shaped reflector, discharge light source, halogen light source, vertical adjusting action member, automatic adjusting system allowing a change in the vertical adjustment of the reflector for a correct headlamp adjustment according to the requirements prescribed for low beam light, a mechanism allowing a change in the horizontal position of low beam light chamber, and a horizontal adjusting action member.

Inside both of the light chambers, in proximity of their optical axes, there are arranged a discharge light source and a halogen light source, which are firmly attached in relation to the light chambers. The discharge light source is used for both low beam and high beam lights. The halogen light source is used for high beam lights and flasher mode operation.

Both light chambers are together vertically adjustable by means of the vertical adjusting action member. The low beam light chamber can be further horizontally rotated (swiveled), in relation to the high beam light chamber, by means of the horizontal adjusting action member.

The optical axis of high beam light chamber, with the halogen light source, is inclined at a predetermined fixed angle to the horizontal plane.

In the low beam operation mode using the low beam light chamber with its discharge light source, the light beam rays produced thereby run divergently below a distinct light-darkness border, whereby this border is inclined below the horizontal plane at a certain angle. The inclination of this boundary with respect to the horizontal plane is kept constant by means of an automatic adjusting system (automatic leveling).

The hot spot for low beam light is situated so as to be below a high-darkness border on the right side of light track from low beam light unit in case of right-hand traffic, and oppositely for left-hand traffic.

For optimization of the high beam light, it is necessary to adjust the low beam light chambers so as to locate the hot spots from the low beam light rays in proximity of the hot spots from the high beam light rays.

In the high beam operation mode, the low beam light chamber with the discharge light source and high beam light chamber with the halogen light source are simultaneously used. The light beam coming out of the high beam light chamber, with the halogen light source, is roughly collimated.

In the above mentioned manner one can achieve better illumination of the road, decreased forefield on the road and better illumination of adjacent road shoulders via means of low beam light dispersion. The adjustment of light chambers is carried out by means of the same action members that are used for headlamp adjustment for the low beam light mode, as well as for the horizontal movement of the low beam light chamber. Automatic adjusting system can work both in the low beam light and high beam light operational modes.

The headlamp itself does not comprise any additional parts over and above the parts usually found with current types of discharge headlamps.

Only software and hardware modification of the automatic adjusting system is needed, and thus, an algorithm for swiveling of low beam light chambers is changed.

"Switching-on" the halogen light source can occur with simultaneous "switching-on" of the high beam light mode and subsequent adjustment of light chambers or in the course of adjusting the light chambers or at the end of adjustment.

BRIEF DESCRIPTION OF THE DRAWINGS

The preferred, but not limiting, embodiment of the present invention is described below with reference to the accompanying drawings, in which.

DETAILED DESCRIPTION

Figure 6:
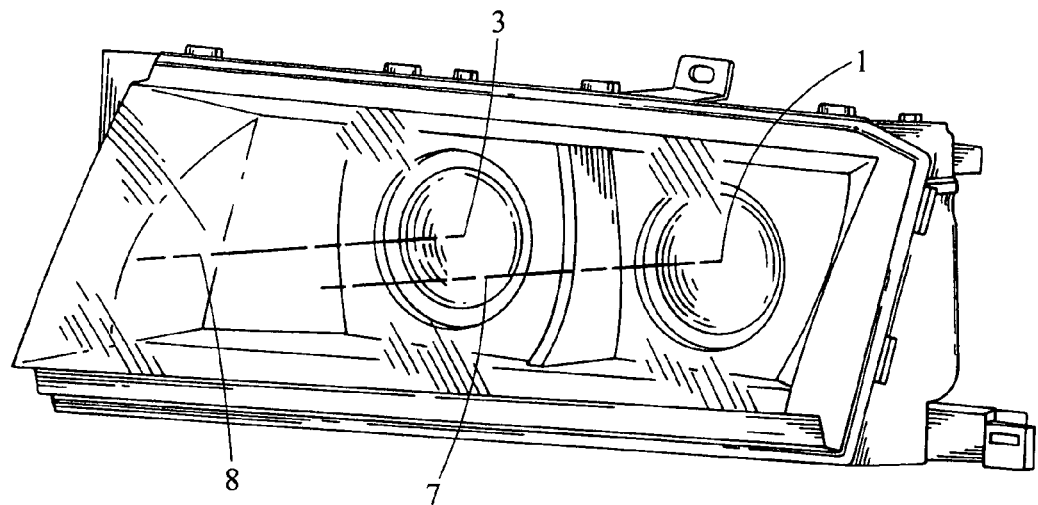
FIGS. 6 and 7 are front and rear perspective views, respectively, of a mechanical embodiment of the headlamp.
Figure 7:
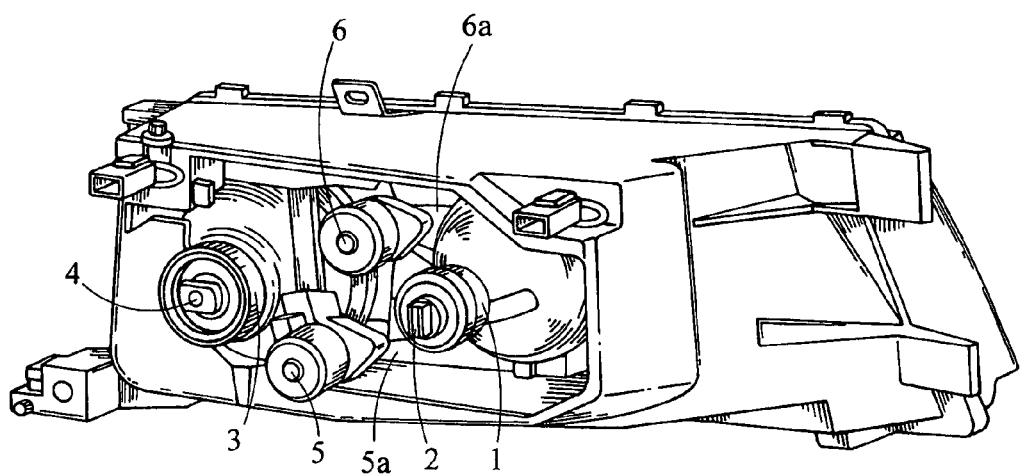
Figure 8:
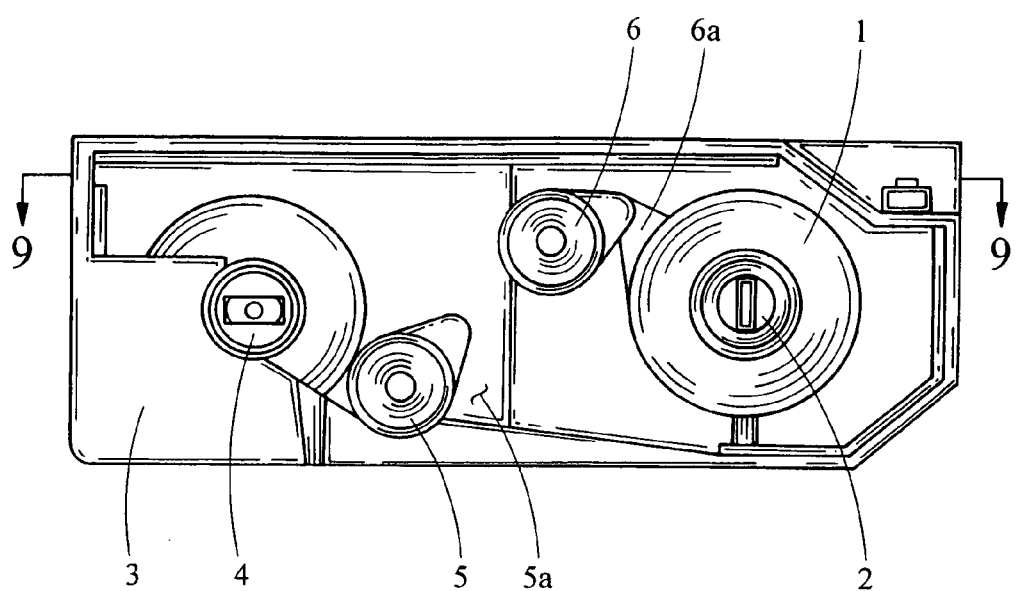
FIG. 8 is a rear view of the mechanical embodiment of the headlamp of FIG. 7.
Figure 9:
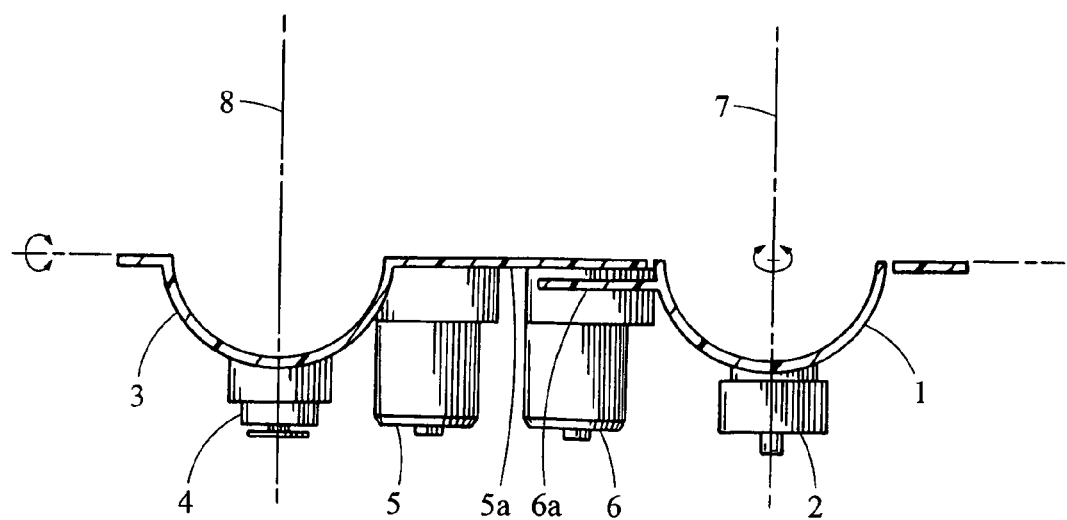
FIG. 9 is a sectional view of the mechanical embodiment of the headlamp of FIG. 8 taken along a line 9-9.

Referring to FIGS. 6 and 7, the headlamp comprises a low beam light chamber 1, a high beam light chamber 3, a discharge light source 2 for the low beam light chamber 1, a halogen light source 4 for the high beam light chamber 3, an adjusting action member 5 for adjusting a vertical headlight adjustment mechanism 5a, a horizontal adjusting action member 6 to adjust a horizontal swiveling mechanism 6a, an optical axis 7 of low beam light chamber 1 and an optical axis 8 of high beam light chamber 3.

Inside both light chambers 1 and 3, in proximity of their optical axes 7 and 8, there are arranged the discharge light source 2 and the halogen light source 4, which are firmly attached in relation to the light chambers 1 and 3 by conventional methods. The discharge light source 2 is used for both low beam and high beam operational modes. The halogen light source 4 is used for the high beam operational mode and a flasher mode.

Both light chambers 1 and 3 are together vertically adjustable by means of the vertical adjusting action member 5. The low beam light chamber 1 can be further horizontally rotated (swiveled), in relation to the high beam light chamber 3, by means of horizontal adjusting action member 6.

Figure 1:
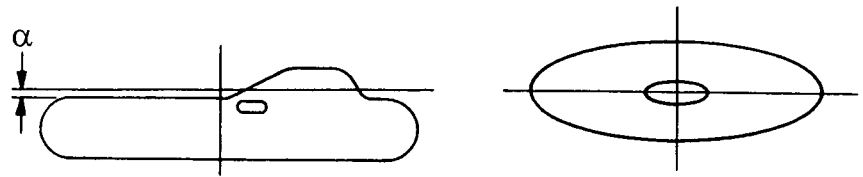
FIG. 1 is a view of the prior art adjustment of light traces from current headlamps wherein a trace from a low beam light chamber is shown on the left and a trace from a high beam light chamber is shown on the right.
Figure 2:
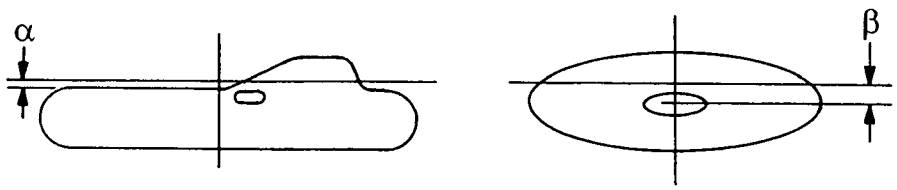
FIG. 2 is a view of a newly proposed adjustment of light traces of the headlamp with optimization of high beam light.
Figure 3:
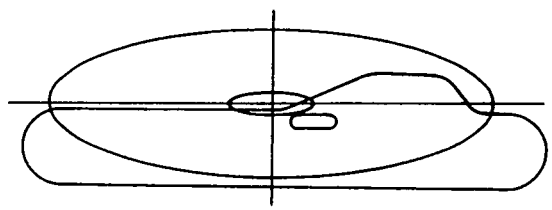
FIG. 3 is a view of composite light traces during the high beam light operational mode without high beam light optimization.
Figure 4:
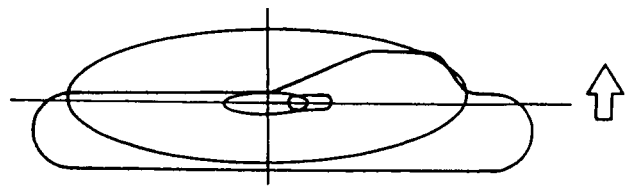
FIG. 4 is a view of composite light traces during the high beam light operational mode with high beam light optimization.
Figure 5:
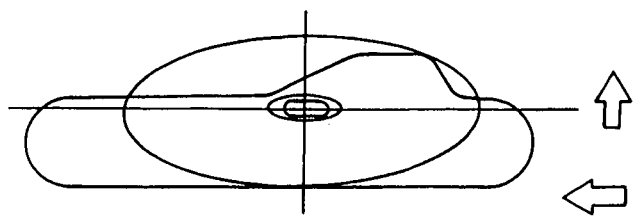
FIG. 5 is a view of composite light traces during the high beam light operational mode with both vertical and horizontal optimization of high beam light.

The optical axis 8 of high beam light chamber 3 with halogen light source 4 is inclined at a predetermined fixed angle β to the horizontal plane, as is noted in FIG. 2, with its hot spot located below the horizontal plane.

In the low beam operation mode using the low beam light chamber 1 with discharge light source 2, the produced rays of the light beam run divergently below a distinct light-darkness border, whereby this border is inclined below the horizontal plane at a certain angle α. The inclination of this boundary to the horizontal plane is kept constant by means of an automatic adjustment system (automatic leveling).

In the high beam operation mode, the low beam light chamber 1 with discharge light source 2 and high beam light chamber 3 with halogen light source are simultaneously used. The light beam coming out of the high beam light chamber 3 with halogen light source 4 is roughly collimated.

For optimization of the high beam light operational mode, it is necessary to adjust the low beam light chambers 1 so as to have hot spot produced by low beam light rays in proximity of hot spot produced by the high beam light rays.

In the above mentioned manner one achieves better illumination of the road, decreased forefield on the road and better illumination of lay-by shoulders by means of low beam light dispersion. The adjustment of light chambers 1 and 3 is carried out by means of the same action members 5 and 6, which are used for adjusting of a correct headlamp adjustment for the low beam light mode as well as for the horizontal movement of the low beam light chamber 1. Automatic adjusting system can work both in the low beam light and high beam light modes.

The invention claimed is:

1. A headlamp for a motor vehicle, the headlamp comprising:
at least one low beam light chamber having a discharge light source;
at least one high beam light chamber in addition to the low beam light chamber;
an automatic control system including a vertical adjusting action member and a horizontal adjusting action member, the vertical adjusting action member being coupled to the at least one low beam light chamber and to the at least one high beam light chamber for concurrent vertical adjustment thereof, the horizontal adjusting action member being coupled to the at least one low beam light chamber for horizontal adjustment of the at least one low beam light chamber independently of the at least one high beam light chamber;
the automatic control system including a low beam light operational mode and a high beam light operational mode, the automatic control system being configured to concurrently vertically adjust the at least one low beam light chamber and the at least one high beam light chamber during movement between the low beam light operational mode and the high beam light operational mode by actuating the vertical adjusting action member, the automatic control system being configured to horizontally adjust at least one low beam light chamber by actuating the horizontal adjusting action member during movement between the low beam light operational mode and the high beam light operational.

2. The headlamp according to claim 1 wherein the horizontal adjusting action member forms part of the mechanism allowing horizontal swiveling of the low beam light chamber.

3. The headlamp according to claim 1 further comprising a halogen light source, and the halogen light source is switched on after the high beam light operation mode is switched on.

4. The headlamp according to claim 3 wherein the halogen light source is provided in the high beam light chamber.

5. A method of adjusting a headlamp for a motor vehicle, the method comprising:
providing a headlamp assembly including at least one low beam light chamber and at least one high beam light chamber, both light chambers having a discharge light source and being concurrently vertically adjustable by a common vertical adjusting action member, and the at least one low beam light chamber being horizontally adjustable independently of the at least one high beam light chamber;
angling the light chambers vertically upward upon activation of a high beam light operational mode relative to a low beam light operational mode.

6. The method of claim 5 further comprising returning the light chambers vertically downward upon activation of the low beam light operational mode relative to the high beam light operational mode.

7. The method of claim 5 further comprising adjusting the at least one low beam light chamber horizontally toward the at least one high beam light chamber upon activation of the high beam light operational mode relative to the low beam light operational mode.

8. The method of claim 7 further comprising swiveling the at least one low beam light chamber horizontally away from the at least one high beam light chamber upon activation of the low beam light operational mode relative to the high beam light operational mode.

* * * * *

UNITED STATES PATENT AND TRADEMARK OFFICE
CERTIFICATE OF CORRECTION

PATENT NO. : 7,322,724 B2
APPLICATION NO. : 10/820913
DATED : January 29, 2008
INVENTOR(S) : Daniel Kletensky et al.

It is certified that error appears in the above-identified patent and that said Letters Patent is hereby corrected as shown below:

Col. 5, line 6, claim 1, after "beam light operational" insert -- mode --.

Signed and Sealed this

Twenty-ninth Day of July, 2008

JON W. DUDAS
*Director of the United States Patent and Trademark Office*